(12) United States Patent
Wu et al.

(10) Patent No.: US 10,298,159 B2
(45) Date of Patent: May 21, 2019

(54) ZERO CROSSING DETECTION CIRCUIT FOR MOTOR CONTROLLER AND METHOD THEREFOR

(71) Applicant: Freescale Semiconductor, Inc., Austin, TX (US)

(72) Inventors: Chongli Wu, Queen Creek, AZ (US); Jie Jin, Suzhou (CN); Yizhong Zhang, Suzhou (CN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/671,076

(22) Filed: Mar. 27, 2015

(65) Prior Publication Data

US 2016/0181956 A1    Jun. 23, 2016

(30) Foreign Application Priority Data

Dec. 23, 2014 (CN) .......................... 2014 1 0858406

(51) Int. Cl.
  *H02P 6/00*    (2016.01)
  *H02P 6/16*    (2016.01)
  *H02P 6/182*   (2016.01)

(52) U.S. Cl.
  CPC .................................. *H02P 6/182* (2013.01)

(58) Field of Classification Search
  CPC ...................................................... H02P 6/182
  USPC .................................................... 318/400.35
  See application file for complete search history.

(56) References Cited

U.S. PATENT DOCUMENTS

| | | | | |
|---|---|---|---|---|
| 5,451,832 A | * | 9/1995 | Cameron | .................. H02P 6/24 318/375 |
| 5,510,687 A | * | 4/1996 | Ursworth | ............. H02H 7/0833 318/471 |
| 5,866,998 A | * | 2/1999 | Menegoli | ................ H02P 6/182 318/400.27 |
| 6,181,093 B1 | | 1/2001 | Park et al. | |
| 7,301,298 B2 | | 11/2007 | Shao et al. | |
| 7,474,069 B2 | | 1/2009 | Palma et al. | |
| 8,278,860 B2 | | 10/2012 | Brown | |
| 2003/0152181 A1 | * | 8/2003 | Stengel | ..................... H03K 7/04 375/371 |
| 2006/0152181 A1 | * | 7/2006 | Shao | ....................... H02P 6/182 318/400.34 |
| 2009/0230905 A1 | * | 9/2009 | Proctor | ................... H02P 6/182 318/400.09 |

(Continued)

FOREIGN PATENT DOCUMENTS

| CN | 101039089 | 9/2007 |
|---|---|---|
| CN | 101144837 | 3/2008 |

(Continued)

OTHER PUBLICATIONS

Shao, Jianwen, "An Improved Microcontroller-Based Sensorless Brushless DC (BLDC) Motor Drive for Automotive Applications," IEEE Transaction on Industry Applications, vol. 42, No. 5, Sep./Oct. 2006, 6 pages.

*Primary Examiner* — Erick D Glass

(57) ABSTRACT

A method includes selectively communicating each of a plurality of motor winding signals to a first node at an integrated circuit based on whether the corresponding motor winding is energized. A zero-crossing event at an unenergized motor winding signal is determined based the unenergized motor winding signal and based on a signal at the first node.

17 Claims, 6 Drawing Sheets

(56) References Cited

U.S. PATENT DOCUMENTS

2012/0249034 A1   10/2012   Dooley
2013/0307454 A1*  11/2013   Hioki .................... G05B 19/40
                                                      318/400.34

FOREIGN PATENT DOCUMENTS

CN      201383787      1/2010
CN      103580563      2/2014

* cited by examiner

ZERO CROSSING DETECTION CIRCUIT FOR MOTOR CONTROLLER AND METHOD THEREFOR

BACKGROUND

This disclosure relates generally to motor controllers, and more particularly to zero crossing detection for a motor controller.

Direct current motors can include sensors or brushes to communicate an angular position of a rotor to a motor controlling device. Alternatively, rotor position of a sensorless and brushless motor can be determined by monitoring a back-electromotive force (EMF) signal generated in non-energized motor windings. The back-EMF signal is generated in the non-energized motor winding as the winding moves through the motor's magnetic field.

BRIEF DESCRIPTION OF THE DRAWINGS

The present disclosure may be better understood, and its numerous features and advantages made apparent to those skilled in the art by referencing the accompanying drawings, where the use of the same reference symbols in different drawings indicates similar or identical items.

DETAILED DESCRIPTION OF THE DRAWINGS

FIGS. 1-6 illustrate techniques for incorporating motor control circuitry at an integrated circuit, such as an integrated circuit formed at a semiconductor die. The techniques are directed to control of three-phase sensorless brushless direct current (BLDC) motors. The integrated circuit includes a zero-crossing detector that identifies a zero-crossing event at a back-EMF (electro-motive force) signal generated at a motor winding when the winding is not energized. For example, a BLDC motor typically includes three stator windings that share a common neutral connection. A zero-crossing event at a back-EMF signal occurs when the signal level of the back-EMF signal equals the voltage at the motor's common neutral connection. As disclosed herein, the integrated circuit includes comparators for identifying the zero-crossing events. The comparators are provided with a virtual neutral reference signal that is generated at the integrated circuit and tracks the signal at the motor winding's common neutral connection. The virtual neutral reference signal is generated by selectively communicating signals received from each motor winding to a virtual neutral circuit node.

For example, switches can be configured to selectively communicate signals received from energized motor windings of the motor to the virtual neutral circuit node, while isolating the back-EMF signal that is received from the unenergized motor winding from the virtual neutral node. Isolating the back-EMF signal from the virtual neutral circuit node prevents the back-EMF current generated in the unenergized motor winding from adversely affecting the virtual neutral reference signal, and thereby allowing the virtual neutral reference signal to better track the voltage at the motor's common neutral connection. In one embodiment, the integrated circuit can include resistors, which in association with corresponding resistors external to the integrated circuit, are configured to provide resistive voltage dividers that limit the level of voltages received at the integrated circuit to safe values.

Figure 1:
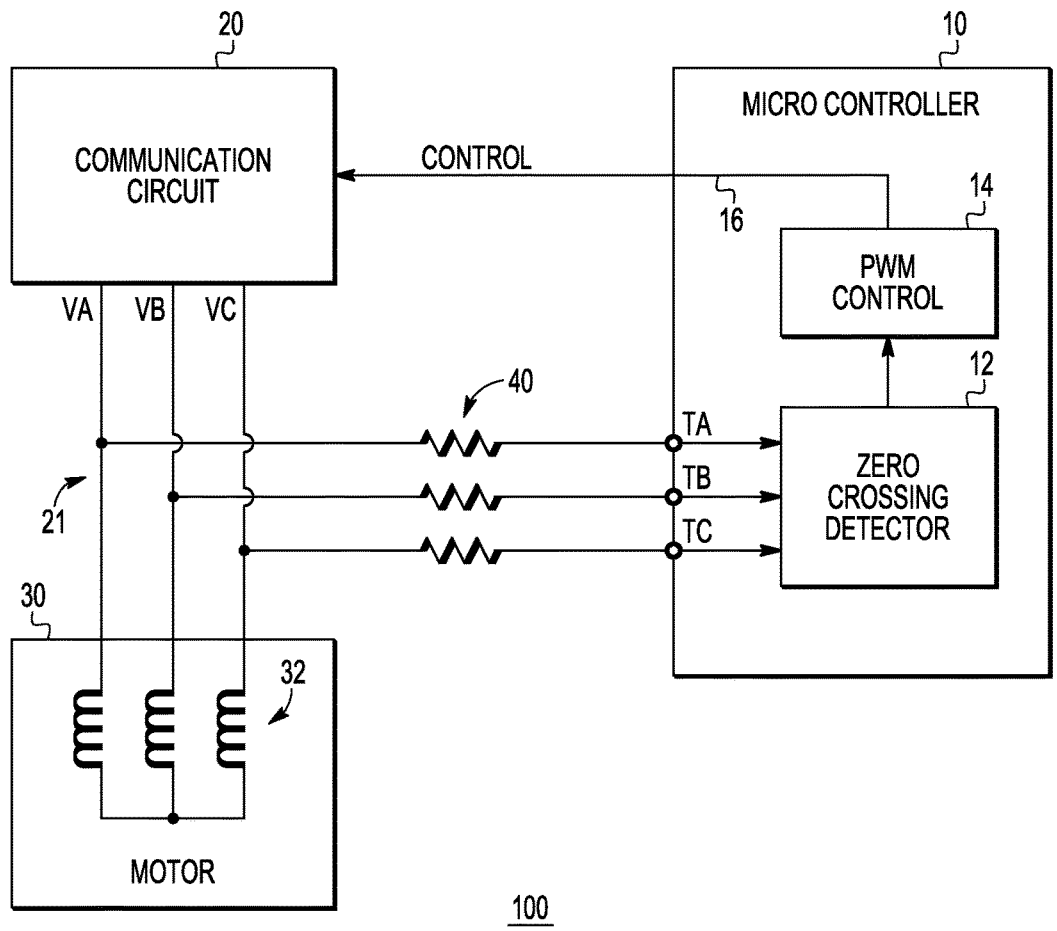
FIG. 1 is a schematic block diagram illustrating a motor control system according to a specific embodiment of the present invention.

FIG. 1 is a schematic block diagram illustrating a motor control system 100 according to a specific embodiment of the present invention. The system 100 includes a data processor illustrated as microcontroller 10, a commutation circuit 20, and a BLDC motor 30. Microcontroller 10 is an integrated circuit and includes a zero-crossing detector 12 and a pulse-width-modulation (PWM) control circuit 14. The microcontroller 10 can include additional circuitry related or unrelated to motor control. For example, the microcontroller 10 can include a microprocessor, a microcomputer, a system on a chip (SOC), and the like. The zero-crossing detector 12 is connected to the PWM control circuit 14 and provides zero-crossing information. The PWM control circuit 14 is connected to the commutation circuit 20 and provides control signals 16. In one embodiment, the control signals 16 can include PWM signals configured to regulate a rotational speed of the BLDC motor 30. These signals are described below with reference to FIGS. 2-4. The commutation circuit 20 can include power-switching transistors, gate drive circuits, dead-time insertion circuitry, and the like. The commutation circuit 20 transforms the control signals 16 provided by the PWM control circuit 14 into signals VA, VB, and VC, which are provided to an interconnect 21. The interconnect 21 is also connected to the motor 30. Signals VA, VB, and VC have voltage and current characteristics selected according to the type and power of the motor 30. The motor 30 includes stator windings 32, arranged in a WYE configuration. The zero-crossing detector 12 is connected to the interconnect 21 by resistors 40.

During operation, the microcontroller 10 can provide an initial set of three-phase PWM signals to the commutation circuit 20. The commutation circuit 20 is arranged to energize two of three stator windings 32 at any particular time based on the three-phase PWM signals, while a third winding remains unenergized. A magnetic field generated within the motor 30 causes a back-EMF signal to be induced in the unenergized winding. As will be discussed in greater detail with reference to FIGS. 3 and 4, the energizing signals are applied in a sequential manner to each stator winding 32. A duty cycle of the PWM control signals determines a rotational speed of the motor 30's rotor. In addition to being provided to the motor 30, signals VA, VB, and VC are also provided to the zero-crossing detector 12. For example, at a particular time, only signals VA and VB include energizing signals provided by the commutation circuit 20, and VC can include a back-EMF signal generated at the unenergized winding of the motor 30. Based on the signals VA, VB, and VC, the zero-crossing detector 12 and the PWM control circuit 14 are configured to identify a rotational angle of the rotor of the motor 30, and to adjust the timing of the control signals 16 supplied to the commutation circuit 20 to establish a desired three-phase control of the motor 30. The resistors 40 are included if the voltage level of signals VA, VB, and VC exceed levels permissible for receipt at the microcontroller 10.

Figure 2:
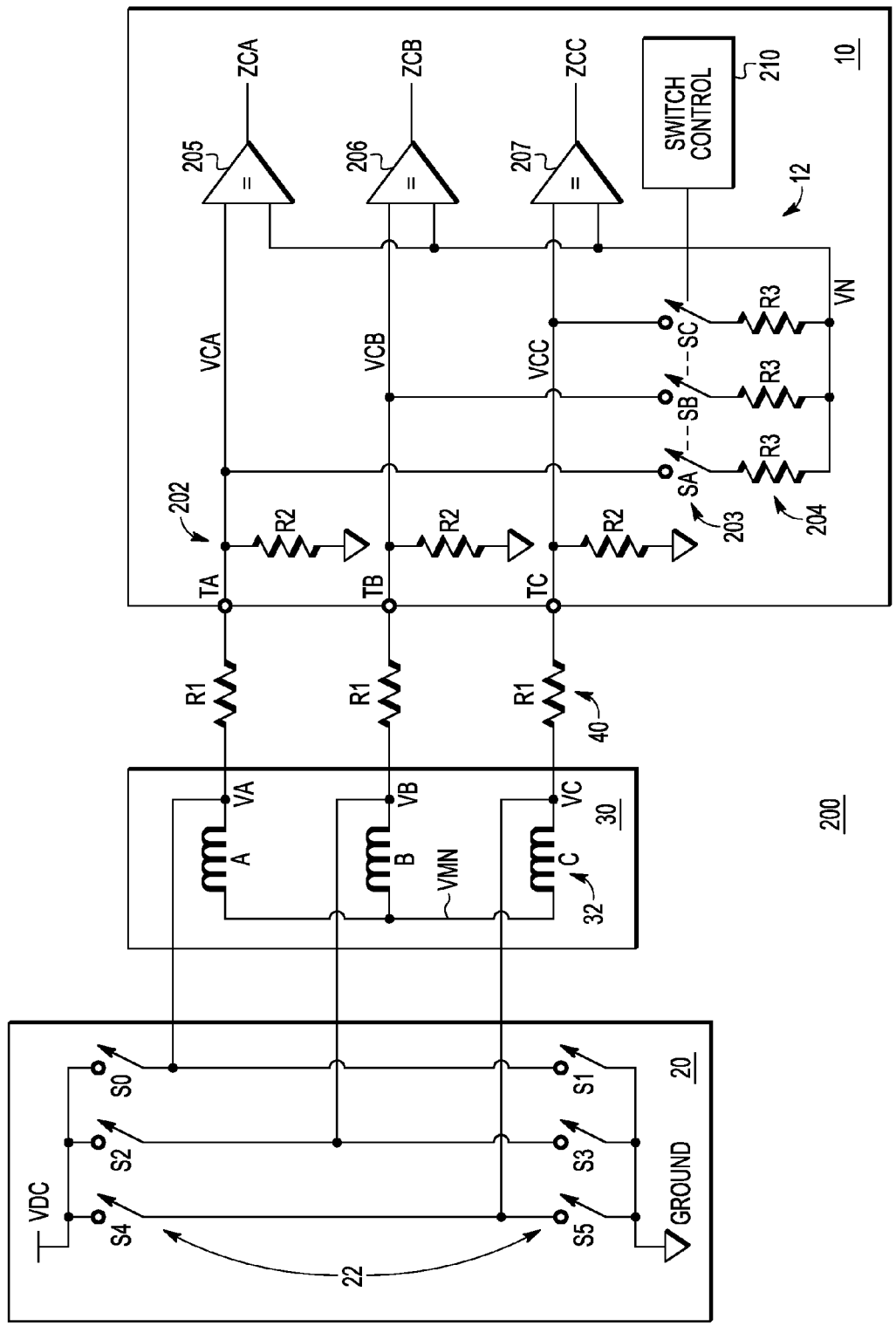
FIG. 2 is a schematic circuit diagram illustrating the motor control system of FIG. 1 according to a specific embodiment of the present invention.

FIG. 2 is a schematic circuit diagram 200 illustrating portions of the motor control system 100 of FIG. 1 according to a specific embodiment of the present invention. The diagram 200 includes a particular embodiment of the commutation circuit 20, motor 30, and microcontroller 10. The commutation circuit 20 includes switches 22, including switches S0, S1, S2, S3, S4, and S5. The motor 30 includes the stator windings 32 including windings A, B, and C. The stator windings 32 include a common neutral connection node VMN. Current electrodes of switches S0 and S1 of the commutation circuit 20 are connected to stator winding A at node VA, current electrodes of switches S2 and S3 of the commutation circuit 20 are connected to stator winding B at node VB, and current electrodes of switches S4 and S5 of the commutation circuit 20 are connected to stator winding C at node VC. A stator winding is said to be energized when one of its corresponding switches is closed. For example, stator winding A is energized when either switch S0 or switch S1 is closed. Similarly, a stator winding is said to be unenergized when corresponding switches are open. For example, stator winding A is unenergized when switches S0 and S1 are both open. Each of nodes VA, VB, and VC is connected to a corresponding one of terminals TA, TB, and TC of microcontroller 10 by the resistor 40, labeled R1. Terminals TA, TB, and TC correspond to interface pins of microcontroller 10. In the following description, it will be appreciated that, for convenience, references labels or numbers can be used interchangeably with respect to a circuit node, a signal at the circuit node, and a voltage at the circuit node. For example, it can be said that a signal VA is provided to node VA, and that signal VA has a voltage VA.

The microcontroller 10 includes components of the zero-crossing detector 12 including resistors 202, switches 203, resistors 204, comparators 205, 206, and 207, and a switch control module 210. In one embodiment, the switch control module 210 can be included at the PWM control circuit 14 shown in FIG. 1. The zero-crossing detector 12 is configured to identify a zero-crossing event occurring at each stator winding when that winding is not energized by the commutator 20. The zero-crossing detector 12 includes circuitry to generate a virtual neutral signal that is configured to track the common neutral connection VMN of the motor 30. In addition, the zero-crossing detector 12 can include circuits to attenuate signals VA, VB, and VC received from the motor 30.

The microcontroller 10 includes terminals TA, TB, and TC. Terminal TA is connected to circuit node VCA and to a first input of the comparator 205. Terminal TB is connected to circuit node VCB and to a first input of the comparator 206. Terminal TC is connected to circuit node VCC and to a first input of the comparator 207. The circuit nodes VCA, VCB, and VCC are each connected to a ground reference voltage by a corresponding resistor 202 (R2). In addition, circuit nodes VCA, VCB, and VCC are each connected to a virtual neutral node VN by a corresponding switch 203 and resistor 204. In particular, node VCA is connected to node VN by series-connected switch SA and a corresponding resistor R3, node VCB is connected to node VN by series-connected switch SB and a corresponding resistor R3, and node VCC is connected to node VN by series-connected switch SC and a corresponding resistor R3. In one embodiment, each of switches 203 can be implemented using a transistor. For example, each of switches 203 can include one or more field effect transistors (FET) or a bipolar transistor.

Figure 3:
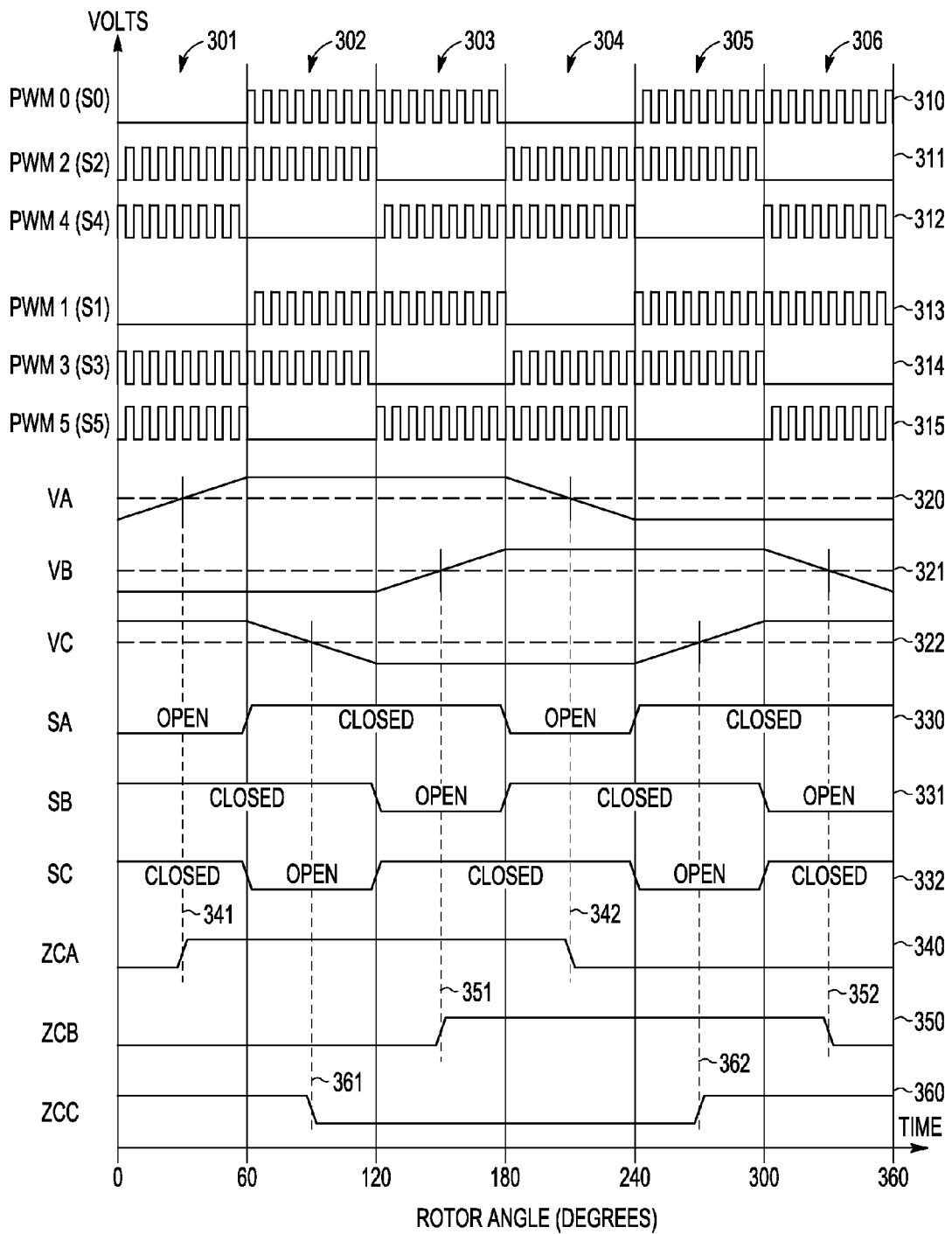
FIG. 3 is a timing diagram illustrating bipolar operation of the motor control system of FIG. 1 according to a specific embodiment of the present invention.
Figure 4:
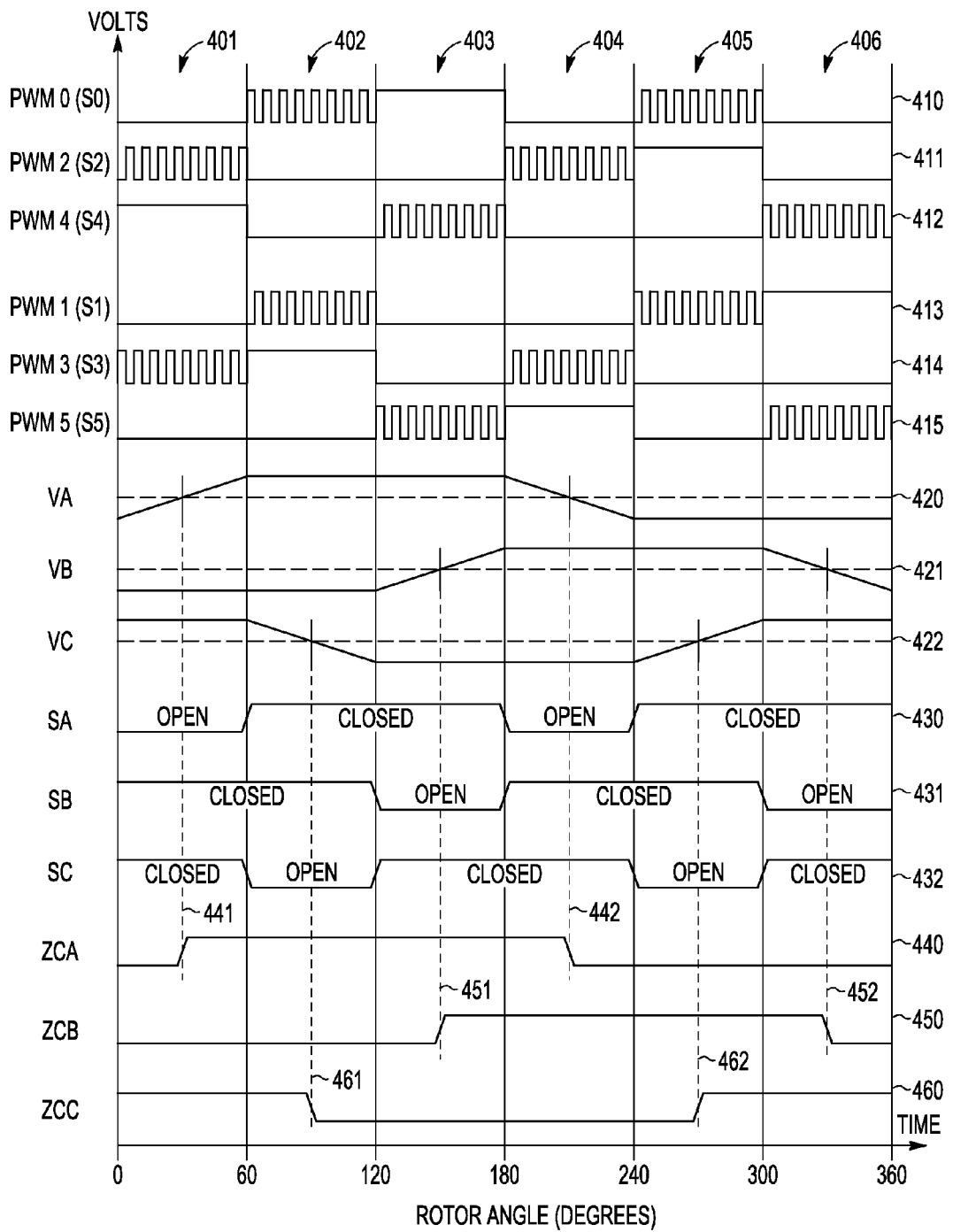
FIG. 4 is a timing diagram illustrating unipolar operation of the motor control system of FIG. 1 according to another embodiment of the present invention.

During operation, switches S0-S5 of the commutation circuit 20 are selectively opened and closed in response to the control signals 16 provided by the PWM control circuit 14 (not shown at FIG. 2). Switches S0-S5 are configured to connect one of a motor supply voltage VDC or a ground reference voltage to the selected stator windings 32. At any particular time, two of the three stator windings 32 are energized by the commutation circuit 20, and a third stator winding is not energized. Accordingly, two signals of signals VA, VB, and VC are energizing signals provided by the commutation circuit 20, and the remaining signal is a back-EMF signal induced within the unenergized winding by a magnetic field generated within the motor 30. The windings 32 are sequentially energized as shown at FIGS. 3-4. The supply voltage VDC can be determined based on the specifications of the motor 30. For example, supply voltage VDC may range from less than five volts to more than one hundred volts.

Resistors 40 (R1) and resistors 202 (R2) provide a resistive voltage divider at each of nodes VCA, VCB, and VCC. For example, if VDC is forty-eight volts, and a supply voltage to be provided to the microcontroller 10 is three volts, the values of resistors R1 and R2 can be selected so that the maximum voltage received at terminals TA-TC is less than or equal to 3 volts. Typically, each of the resistors 40 has the same value, as do each of the resistors 202. Therefore, signals received at terminals TA, TB, and TC are attenuated by the same fractional amount relative to the values of signals VA, VB, and VC, respectively. If the motor supply voltage VDC is less than or equal to the operating voltage of the microcontroller 10, the resistor 40 can be omitted because no signal attenuation is required.

During operation, switch control 210 selectively opens and closes switches 203. In particular, switch control 210 is configured to close switches corresponding to energized windings, and to open the remaining switch corresponding to an unenergized winding. For example, at a particular angular position of the rotor of the motor 30, the PWM control circuit 14 and the commutation circuit 20 may energize motor windings A and B, leaving winding C unenergized. The switch control 210, which is substantially synchronized with the operation of the PWM control 14 and the commutation circuit 20, closes switches SA and SB corresponding to the energized windings A and B, and opens switch SC corresponding to the unenergized winding C. As each motor winding is sequentially energized and unenergized, the switch control 210 sequentially actuates switches 203 so that the switch corresponding to the unenergized winding is open, while the switches corresponding to the energized windings are closed. A switch 203 corresponding to an unenergized winding is opened to prevent the back-EMF signal in an unenergized winding from affecting the potential at virtual neutral VN.

During operation of the motor control system 10, supply voltage VDC is divided equally between two energized windings of the windings 32, so a voltage at the common neutral connection VMN of the stator winding 32 is VDC/2. Because two stator windings are energized at any particular time, a voltage at the virtual neutral node VN is determined based on the equation:

$$VN = VDC \frac{R2}{2(R1 + R2)} \quad (1)$$

Therefore, a voltage at the virtual neutral node VN is equal to the voltage at the common neutral connection VMN attenuated by the resistor divider provided by R1 and R2. Signals at nodes VCA, VCB, and VCC are each attenuated by resistors R1 and R2, and signal levels at these nodes are determined by the equations:

$$VCA = VA\frac{R2}{R1+R2} \quad (2)$$

$$VCB = VB\frac{R2}{R1+R2} \quad (3)$$

$$VCC = VC\frac{R2}{R1+R2} \quad (4)$$

A zero-crossing event at a back-EMF signal corresponds to when a signal level of the back-EMF that is induced in an unenergized winding is equal to the voltage at the common neutral connection VMN at the motor 30. Therefore, the zero-crossing event also corresponds to when the attenuated back-EMF, at one of nodes VCA, VCB, or VCC, is equal to the voltage at the virtual neutral node VN. The comparators 205-207 are configured to detect such an event. For example, if stator winding A is unenergized, back-EMF induced in winding A is attenuated by resistors R1 and R2 connected to terminal TA and applied to a first input of the comparator 205. A virtual neutral potential VN, derived from energized windings B and C, is applied to a second input of the comparator 205. Accordingly, output ZCA is asserted or deasserted when the potential at node VCA is equal to the potential at node VN, which corresponds to a time of a zero crossing event at a back-EMF signal at winding A. Similarly, output ZCB of the comparator 206 is asserted or deasserted when a back-EMF zero-crossing event occurs at winding B, and output ZCC of the comparator 207 is asserted or deasserted when a back-EMF zero-crossing event occurs at winding C. In one embodiment, switches (not shown at FIG. 2) can be configured to isolate the outputs of the comparators 205-207 from inputs at the PWM control circuit 14 (not shown at FIG. 2) when zero-crossing detect signals ZCA, ZCB, and ZCC are invalid. For example, the PWM control circuit 14 and the commutation circuit 20 may operate in either a unipolar or in a bipolar configuration. In particular, when the motor control system 100 is operating in a unipolar configuration, a back-EMF signal induced in an unenergized winding will periodically alternate between an active back-EMF level and a ground level based on the phase of the PWM control signals 16. FIGS. 3 and 4 illustrate bipolar and unipolar operation of the operation of the motor control system 100.

FIG. 3 is a timing diagram 300 illustrating bipolar operation of the motor control system of FIG. 1 according to a specific embodiment of the present disclosure. The horizontal axis of the timing diagram 300 illustrates intervals 301-306 of a single 360 degree rotation of the rotor of the motor 30. Each interval of the intervals 301-306 represents sixty degrees of rotor rotation, so the sequence of intervals 301-306 repeats for every complete rotation of the rotor. Interval 301 corresponds to an angular rotation of the rotor of motor 30 of between zero and 60 degrees. Similarly, interval 302 corresponds to a rotation from 60-120 degrees, interval 303 corresponds to a rotation from 120-180 degrees, interval 304 corresponds to a rotation from 180-240 degrees, interval 305 corresponds to a rotation from 240-300 degrees, and interval 306 corresponds to a rotation from 300-360 degrees.

The vertical axis of the timing diagram 300 illustrates various timing waveforms associated with the microcontroller 10, commutation circuit 20, and motor 30, in units of volts. Waveforms 310-315 correspond to signals PWM0, PWM1, PWM2, PWM3, PWM4, and PWM5. Each of signals PWM0-5 is provided to a corresponding switch 22 S0-S5 at the commutation circuit 20 of FIG. 2. Signal 310 PWM0 controls switch S0 of switches 22 of the commutater 20. Similarly, signal PWM1 311 controls switch S1, signal PWM2 312 controls switch S2, signal PWM3 313 controls switch S3, signal PWM4 314 controls switch S4, and signal PWM5 315 controls switch S5. In one embodiment, signals 310-315 are substantially the same as the control signals 16 of FIG. 1, and a gate driver circuit at commutation circuit 20 does not require dead-time insertion capability. In another embodiment, the control signals 16 include only three PWM signals, for example corresponding substantially to PWM0, PWM2, and PWM4. In this embodiment, a gate driver circuit at the commutation circuit 20 performs dead-time insertion.

Switches 22 S0-S5 of the commutation circuit 20 are individually asserted in response to signals PWM0-5 to energize the motor windings 32 of the motor 30. For example, during interval 301, signals PWM0 and PWM1 are inactive, causing switches S0 and S1 to be set to an open configuration. Current electrodes of switches S0 and S1 are connected to winding A at node VA. Therefore, winding A is not energized during interval 301. During interval 301, signals PWM2 and PWM3 are active, illustrated as having a pulse width modulation duty cycle of fifty percent. Assertion of signal PWM2 closes switch S2 and assertion of signal PWM3 closes switch S3. Switches S2 and S3 are alternatingly activated. Current electrodes of switches S2 and S3 are connected to winding B at node VB. Closure of switch S2 connects supply voltage VDC to node VB, and closure of switch S3 connects the ground reference voltage to node VB. Similarly, during interval 301, signals PWM4 and PWM5 are active. Assertion of signal PWM4 closes switch S4 and assertion of signal PWM5 closes switch S5. Switches S4 and S5 are alternatingly activated. Current electrodes of switches S4 and S5 are connected to winding C at node VC. Closure of switch S4 connects supply voltage VDC to node VC, and closure of switch S5 connects the ground reference voltage to node VC.

Waveforms 320, 321, and 322 correspond to average values of signals at nodes VA, VB, and VC, respectively. Waveforms 320-322 are shown with reference to the voltage at the common neutral connection node VMN of the motor windings 32, which has a voltage during operation of VDC/2. During interval 301, the average voltage level of signal VB 321 is less than VDC/2, and the average voltage level of signal VC 322 is greater than VDC/2. One of skill in the art will appreciate that a PWM duty cycle of fifty percent is illustrated for clarity; however an actual duty cycle of signals PWM0-PWM5 will vary over time. For example, the average voltage of signal VB is determined based on a relative duty cycle of signals PWM2 and PWM3. During interval 301, the average voltage at node VB is less than VDC/2 because signal PWM3 activates switch S3 connecting the ground reference voltage to node VB for a greater percentage of time than signal PWM2 activates switch S2 connecting the supply voltage VDC to node VB. In contrast, during interval 301, the average voltage at node VC is greater than VDC/2 because signal PWM4 activates switch S4 connecting the supply voltage VDC to node VC for a greater percentage of time than signal PWM5 activates switch S5 connecting the ground reference voltage to node VC.

During interval 301, winding A is not energized, and the waveform VA 320 during interval 301 represents a back-EMF signal induced in winding A. As winding A rotates through the motor's magnetic fields, the magnitude of the induced back-EMF varies. For example, during interval 301, the voltage at node VA shown transitioning from a value that is less than VDC/2 to a value that is greater than VDC/2. At a rotor angle of approximately thirty degrees, a zero-crossing event occurs at waveform VA, illustrated by reference 341, where the signal level of the back-EMF signal at node VA crosses the horizontal axis, which represents the potential at the common neutral connection VMN of windings 32, VDC/2. Winding A is once again unenergized during interval 304, where another zero-crossing event occurs at reference 342. During intervals 303 and 306, winding B is unenergized and a back-EMF zero-crossing event is illustrated at references 351 and 352. During intervals 302 and 305, winding C is unenergized and a back-EMF zero-crossing event is illustrated at references 361 and 362.

Waveforms 330, 331, and 332 correspond to control electrodes at switches 203 S0, S1, and S2 of zero-crossing detector 12, respectively. For example, during interval 301, winding A is unenergized, so switch S0 is configured to be open. Windings B and C are energized, so switches SB and SC are configured to be closed. During interval 302, switches SA and SB are closed because windings A and B are energized, and switch SC is open because winding C is unenergized. During interval 303, switches SA and SC are closed because windings A and C are energized, and switch SB is open because winding B is unenergized. During interval 304, switches SB and SC are closed because windings B and C are energized, and switch SA is open because winding A is unenergized. During interval 305, switches SA and SB are closed because windings A and B are energized, and switch SC is open because winding C is unenergized. During interval 306, switches SA and SC are closed because windings A and C are energized, and switch SB is open because winding B is unenergized.

Waveforms 340, 350, and 360 correspond to signals ZCA, ZCB, and ZCC at the outputs of the comparators 205, 206, and 207 of FIG. 2, respectively. For example, signal ZCA is asserted in response to the zero-crossing event at signal VA indicated by reference 341, and deasserted in response to the zero-crossing event at signal VA indicated by reference 342. Signal ZCB is asserted in response to the zero-crossing event at signal VB indicated by reference 351, and de-asserted in response to the zero-crossing event at signal VB indicated by reference 352. Signal ZCC is asserted in response to the zero-crossing event at signal VC indicated by reference 361, and de-asserted in response to the zero-crossing event at signal VC indicated by reference 362. While waveforms 340, 350, and 360 identify zero-crossing events with signal transitions, one of skill will appreciate that the comparators 205-207 can indicate zero-crossing events in another manner, for example by pulses, or the like.

During operation, zero-crossing detect signals ZCA, ZCB, and ZCC control the timing of control signals 16 and PWM signals 310-315, and PWM signals 310-315 ultimately control the timing of zero-crossing events, and ultimately the timing of signals ZCA, ZCB, and ZCC. Accordingly, the motor control system 100 can be referred to as a closed loop feedback system.

FIG. 4 is a timing diagram 400 illustrating unipolar operation of the motor control system of FIG. 1 according to a specific embodiment of the present disclosure. The horizontal axis of timing diagram 400 illustrates intervals 401-406 of a single 360 degree rotation of the rotor of motor 30. The vertical axis illustrates waveforms corresponding to PWM signals 410-416, average values of signals at nodes VA, VB, and VC, respectively, waveforms 430, 431, and 432 corresponding to control electrodes at switches 203 S0, S1, and S2 of the zero-crossing detector 12, respectively, and waveforms 440, 450, and 460 corresponding to signals ZCA, ZCB, and ZCC at the outputs of comparators 205, 206, and 207 of FIG. 2, respectively. Zero-crossing events correspond to references 441, 442, 451, 452, 461, and 462.

Timing diagram 400 is similar to timing diagram 300 of FIG. 3 with only one exception. In a unipolar PWM system, only one leg of each phase is switching and a second phase is constantly asserted. For example, at interval 401, PWM2 411 and PWM3 414 are active and commutation switches S2 and S3 are alternatingly turned on, switch S4 is constantly closed, and switch S5 is constantly open. In a unipolar system, a back-EMF signal in an unenergized winding switches alternates between a valid state and a ground state. Therefore, switches included at the outputs of the comparators 205-207 (not shown at FIG. 2) are configured to pass zero-crossing detect signals ZCA, ZCB, and ZCC to the PWM control circuit 14 only when the zero-crossing signals are valid. In contrast, PWM signals applied to energized phases operate in dialog in a bipolar PWM system. In a bipolar system, back EMF induced in unenergized phases monotonically increases from negative to positive, or decreases from positive to negative.

Figure 5:
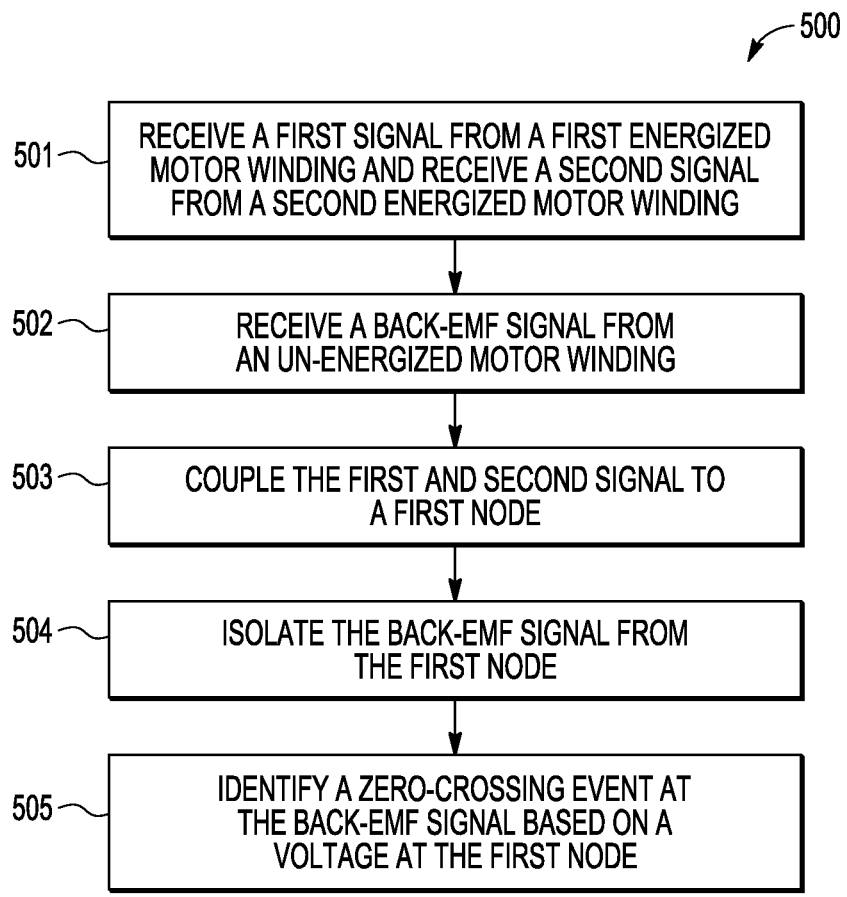
FIG. 5 is a flow chart illustrating a method for identifying a zero-crossing event according to a specific embodiment of the present invention.

FIG. 5 is a flow chart illustrating a method 500 for identifying a zero-crossing event according to a specific embodiment of the present disclosure. The method 500 begins at block 501 where a first signal from a first energized motor winding is received, and a second signal from a second energized motor winding is received. At block 502, a back-EMF signal from an unenergized motor winding is received. For example, at interval 350 of FIG. 3, windings B and C are energized and winding A is unenergized. Signals VA, VB, VC, which correspond to windings A, B, and C, respectively, are connected to zero-crossing detector 12 via resistors 40 R1.

The method 500 continues at block 503 where the first and second signals are communicated to a first node. For example, signal VB, corresponding to energized winding B, is connected to virtual neutral node VN at the zero-crossing detector 12 via resistor 40 R1, resistor 204 R3, and switch 203 SB. Similarly, signal VC, corresponding to energized winding C, is connected to virtual neutral node VN at the zero-crossing detector 12 via resistor 40 R1, resistor 204 R3, and switch 203 SC. The method continues at block 504 where the back-EMF signal is isolated from the first node. For example, at interval 350 of FIG. 3, winding A is unenergized, and signal VA corresponding to winding A is isolated from virtual neutral node VN by switch 203 SA, which is open during interval 350.

The method 500 continues at block 505 where a zero-crossing event at the back-EMF signal is identified based on a voltage at the first node. For example, during interval 350, the comparator 205 is configured to compare signal VCA to a virtual neutral reference voltage at node VN. Zero-crossing detect signal ZCA is asserted during interval 301 or deasserted during interval 304 when the level of the back-EMF signal is equal to the virtual neutral reference voltage VN, which corresponds to a zero-crossing event at winding A. By isolating the back-EMF signal at the unenergized winding from node VN, the virtual neutral reference voltage at node VN is determined only by signals from the energized winding.

Figure 6:
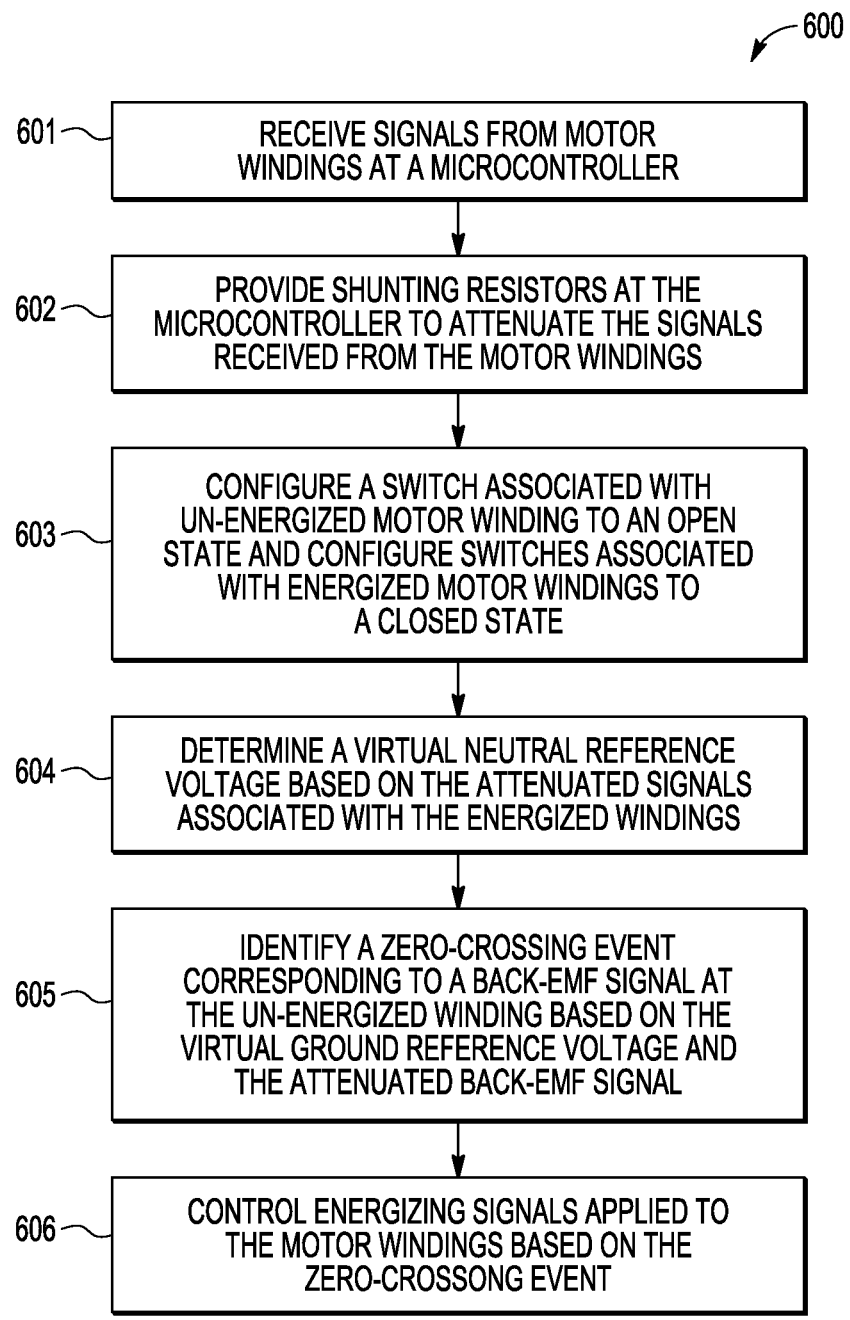
FIG. 6 is a flow chart illustrating a method for identifying a zero-crossing event according to another embodiment of the present invention.

FIG. 6 is a flow chart illustrating a method 600 for identifying a zero-crossing event according to another embodiment of the present disclosure. The method 600 begins at block 601 where signals from motor windings are received at a microcontroller. For example, FIGS. 1 and 2 illustrate signals VA, VB and VC associated with the motor windings 32. The signals are connected via resistors 40 to terminals TA, TB, and TC of the microcontroller 10, where they are provided to the zero-crossing detector 12. The method continues at block 602 where shunting resistors are provided at the microcontroller to attenuate the signals received from the motor windings. For example, a resistor 202 is connected between each of nodes VCA, VCB, and VCC and a ground reference. Resistor 40 (R1) and resistor 202 (R2) are configured to together provide a resistive voltage divider. Accordingly, signals VA, VB, and VC are each attenuated by the same amount.

The method 600 continues at block 603 where a switch associated with an unenergized motor winding is configured to an open state, and switches associated with energized motors windings are configured to a closed state. For example, the switch control circuit 210 of FIG. 2 controls the state of each of switches 203 based on whether a corresponding motor winding is energized or is unenergized. The method 600 continues at block 604 where a virtual neutral reference voltage is determined based on the attenuated signals associated with the energized windings. For example, during interval 350 at FIG. 3, the voltage at node VN is determined based on the attenuated signals corresponding to energized windings B and C. Because switch SA is open, a back-EMF signal present at winding A does not affect the voltage at node VN. Therefore, the voltage at the virtual neutral node VN tracks the voltage at the common neutral connection VMN of the motor 30.

The method 600 continues at block 605 where a zero-crossing event corresponding to a back-EMF signal at the unenergized winding is identified based on the virtual neutral reference voltage and the attenuated back-EMF signal. For example, during interval 350 at FIG. 3, the comparator 205 of FIG. 2 receives an attenuated back-EMF signal VCA at one input, and receives the virtual neutral signal at the other input. The comparator output ZCA is asserted when a zero-crossing event occurs in winding A, as illustrated at reference 341 of FIG. 3. The method continues at block 606 where energizing signals applied to the motor windings are controlled based on the zero-crossing event. For example, the timing of control signals 16 generated by the PWM control circuit 14 are determined based on zero-crossing detect signals ZCA, ZCB, and ZCC.

In a first aspect, a method can include receiving a first signal from a first energized motor winding, receiving a second signal from a second energized motor winding, receiving a third signal from an unenergized motor winding, communicating the first and second signal to a first node to generate a fourth signal at the first node, isolating the third signal from the first node, and determining a zero-crossing event at the third signal based on the fourth signal.

In one embodiment of the first aspect, the first signal is selectively communicated to the first node via a first switch, the second signal is selectively communicated to the first node via a second switch, and the third signal is selectively communicated to the first node via a third switch, each switch comprising a transistor. In another embodiment, the first switch is closed to communicate the first signal to the first node if the first motor winding is energized, and the third switch is opened to isolate the third signal from the first node if the third motor winding is not energized. In a further embodiment, the third signal is a back-electromotive force (EMF) signal generated at the unenergized motor winding.

In a further embodiment of the first aspect, the method includes energizing the first motor winding based on determining the zero-crossing event. In yet another embodiment, the method includes receiving the first signal further comprises receiving the first signal at a first terminal of an integrated circuit device, the first terminal coupled to the first energized motor winding via a first resistor external to the integrated circuit device, and wherein the first signal is communicated to a first reference voltage via a second resistor included at the integrated circuit device. In yet a further embodiment, the method includes receiving the third signal further comprises receiving the third signal at a first terminal of an integrated circuit device, the first terminal coupled to the unenergized motor winding via a first resistor external to the integrated circuit device, and wherein the first signal is communicated to a first reference voltage via a second resistor included at the integrated circuit device.

In still another embodiment of the first aspect, the first signal is communicated to the first node via a first resistor, the second signal is communicated to the first node via a second resistor, and the third signal is communicated to the first node via a third resistor. In still a further embodiment, the third signal is communicated to a first input of a voltage comparator, the fourth signal is communicated to a second input of the voltage comparator, and the zero-crossing event is determined based on a signal at an output of the voltage comparator. In another embodiment, the method includes receiving the first signal at a first terminal of an integrated circuit, receiving the second signal at a second terminal of the integrated circuit, and receiving the third signal at a third terminal of the integrated circuit.

In a second aspect, a device can include a first terminal to receive a first signal from a first motor winding, a second terminal to receive a second signal from a second motor winding, a third terminal to receive a third signal from a third motor winding, and a first switch to selectively couple the first terminal to a first node, a second switch to selectively couple the second terminal to the first node, a third switch to selectively couple the third terminal to the first node, and a first comparator including a first input coupled to the first terminal, a second input coupled to the first node, and an output to provide a signal indicating a zero-crossing event at the first signal.

In one embodiment of the second aspect, the device includes a switch control module to close the first switch if the first motor winding is energized, and to open the first switch if the first motor winding is not energized. In another embodiment, the device includes a fourth terminal to provide a signal to selectively energize the first motor winding based on the zero-crossing event.

In a further embodiment, the device includes a first resistor coupling the first terminal to a first reference voltage, a second resistor coupling the first terminal to the first reference voltage, and a third resistor coupling the first terminal to the first reference voltage.

In yet another embodiment of the first aspect, the first terminal is coupled to the first motor winding via a first resistor, the second terminal is coupled to the second motor winding via a second resistor, and the third terminal is coupled to the third motor winding via a third resistor. In yet a further embodiment, the first switch is coupled to the first node via a first resistor, the second switch is coupled to the first node via a second resistor, and the third switch is coupled to the first node via a third resistor.

In a third aspect, a method can include selectively communicating each of a plurality of motor winding signals to a first node at an integrated circuit based on whether the corresponding motor winding is energized, and determining a zero-crossing event at an unenergized motor winding signal based the unenergized motor winding signal and based on a signal at the first node.

In one embodiment of the third aspect, the method includes selectively isolating each of the plurality of motor winding signals from the first node based on whether the corresponding motor winding is not energized. In a further embodiment, the method includes receiving a first motor winding signal of the plurality of motor winding signals at a first terminal of the integrated circuit, the first terminal coupled to the first motor winding via a first resistor external to the integrated circuit device, and wherein the first signal is communicated to a first reference voltage via a second resistor included at the integrated circuit device. In yet another embodiment, each of the plurality of motor winding signals is communicated to the first node via a corresponding switch included at the integrated circuit, each switch comprising a transistor.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The invention claimed is:

1. A method, comprising:
    receiving a first signal from a first energized motor winding;
    receiving a second signal from a second energized motor winding;
    receiving a third signal from an unenergized motor winding;
    communicating the first and second signal to a first node to generate a fourth signal at the first node;
    isolating the third signal from the first node; and
    determining a zero-crossing event at the third signal based on the fourth signal,
    wherein the first signal is communicated to the first node via a first resistor, the second signal is communicated to the first node via a second resistor, and the third signal is communicated to the first node via a third resistor.

2. The method of claim 1, wherein the first signal is selectively communicated to the first node via a first switch, the second signal is selectively communicated to the first node via a second switch, and the third signal is selectively communicated to the first node via a third switch, each switch comprising a transistor.

3. The method of claim 2, wherein the first switch is closed to communicate the first signal to the first node if the first motor winding is energized, and the third switch is opened to isolate the third signal from the first node if the third motor winding is not energized.

4. The method of claim 1, wherein the third signal is a back-electromotive force (EMF) signal generated at the unenergized motor winding.

5. The method of claim 1, further comprising energizing the first motor winding based on determining the zero-crossing event.

6. The method of claim 1, wherein receiving the first signal further comprises receiving the first signal at a first terminal of an integrated circuit device, the first terminal coupled to the first energized motor winding via a first resistor external to the integrated circuit device, and wherein the first signal is communicated to a first reference voltage via a second resistor included at the integrated circuit device.

7. The method of claim 1, wherein receiving the third signal further comprises receiving the third signal at a first terminal of an integrated circuit device, the first terminal coupled to the unenergized motor winding via a first resistor external to the integrated circuit device, and wherein the first signal is communicated to a first reference voltage via a second resistor included at the integrated circuit device.

8. The method of claim 1 wherein the third signal is communicated to a first input of a voltage comparator, the fourth signal is communicated to a second input of the voltage comparator, and the zero-crossing event is determined based on a signal at an output of the voltage comparator.

9. The method of claim 1, further comprising:
    receiving the first signal at a first terminal of an integrated circuit;

receiving the second signal at a second terminal of the integrated circuit; and receiving the third signal at a third terminal of the integrated circuit.

10. A device, comprising:

a first terminal to receive a first signal from a first motor winding;

a second terminal to receive a second signal from a second motor winding;

a third terminal to receive a third signal from a third motor winding;

a first switch to selectively couple the first terminal to a first node;

a second switch to selectively couple the second terminal to the first node;

a third switch to selectively couple the third terminal to the first node; and a first comparator including a first input coupled to the first terminal, a second input coupled to the first node, and an output to provide a signal indicating a zero-crossing event at the first signal, wherein:

the first terminal is coupled to the first motor winding via a first resistor;

the second terminal is coupled to the second motor winding via a second resistor; and the third terminal is coupled to the third motor winding via a third resistor.

11. The device of claim 10, further comprising a switch control module to close the first switch if the first motor winding is energized, and to open the first switch if the first motor winding is not energized.

12. The device of claim 10, further comprising a fourth terminal to provide a signal to selectively energize the first motor winding based on the zero-crossing event.

13. The device of claim 10, further comprising:

a first resistor coupling the first terminal to a first reference voltage;

a second resistor coupling the second terminal to the first reference voltage; and a third resistor coupling the third terminal to the first reference voltage.

14. The device of claim 10, wherein:

the first switch is coupled to the first node via a first resistor;

the second switch is coupled to the first node via a second resistor; and the third switch is coupled to the first node via a third resistor.

15. A method, comprising:

selectively communicating each of a plurality of motor winding signals to a first node at an integrated circuit in response to determining that the corresponding motor winding is energized;

determining a zero-crossing event at an unenergized motor winding signal based on the unenergized motor winding signal and based on a signal at the first node; and receiving a first motor winding signal of the plurality of motor winding signals at a first terminal of the integrated circuit, the first terminal coupled to the first motor winding via a first resistor external to the integrated circuit device, and wherein the first signal is communicated to a first reference voltage via a second resistor included at the integrated circuit device.

16. The method of claim 15, further comprising selectively isolating each of the plurality of motor winding signals from the first node based on whether the corresponding motor winding is not energized.

17. The method of claim 15, wherein each of the plurality of motor winding signals is communicated to the first node via a corresponding switch included at the integrated circuit, each switch comprising a transistor.

* * * * *